Jan. 3, 1956  LUKE C. L. YUAN  2,729,787
VACUUM-TUBE VOLTMETER
Filed July 26, 1949

INVENTOR.
LUKE C. L. YUAN
BY M. O. Hayes
ATTORNEY

United States Patent Office 2,729,787
Patented Jan. 3, 1956

2,729,787
VACUUM TUBE VOLTMETER

Luke C. L. Yuan, Princeton, N. J., assignor to the United States of America as represented by the Secretary of the Navy Application July 26, 1949, Serial No. 106,835

1 Claim. (Cl. 324—123)

This invention relates to the art including electrical measuring instruments, and more particularly to a high-precision vacuum-tube voltmeter.

With increasingly wide use of test equipment of the type including proportional counters and ionization chambers, such as are used in cosmic-ray and nuclear studies, a very high-resistance direct-current voltmeter for accurately determining the operational point of the equipment characteristic is desirable, especially for precision work.

High voltage vacuum-tube voltmeters are known, which are based on the principle of the inverted characteristic of a vacuum tube, that is to say, by applying the negative terminal of the voltage to be measured to the plate and reading the grid current, which is calibrated at a fixed grid voltage. However, the accuracy of the known types of voltmeter is severely limited by the accuracy of the grid-current meter. Furthermore, the grid current-plate voltage characteristic is only approximately linear and only over a limited range, owing to the varying space-charge conditions accompanying the change in grid current.

Accordingly, it is a primary object of this invention to provide a circuit for the measurement of high voltages in the range of 0 to minus 5000 volts, which has a high precision and an extremely linear characteristic over the entire range.

In accordance with the principles of this invention, a circuit is provided that involves the use of a high-voltage vacuum tube having a high amplification factor. The negative terminal of the voltage to be measured is applied to the plate of the tube and the grid voltage is varied to maintain a constant grid current. Thus, by knowing the amplification factor of the tube, the change in grid voltage gives the change in the plate voltage. It is to be observed, that inasmuch as the grid current is kept constant in this method, the space-charge effect remains practically unchanged over a wide range of variation of the plate voltage, thus giving linearity in the plate voltage-grid voltage characteristic. Furthermore, in maintaining a constant grid current, a null method is used when varying the grid voltage by balancing the grid current against a constant current source. In this way, extremely high accuracy can be obtained in the measurement of the grid voltage. The high amplification factor of the tube gives the advantage of a low operating voltage and a better linearity.

Figure 1:
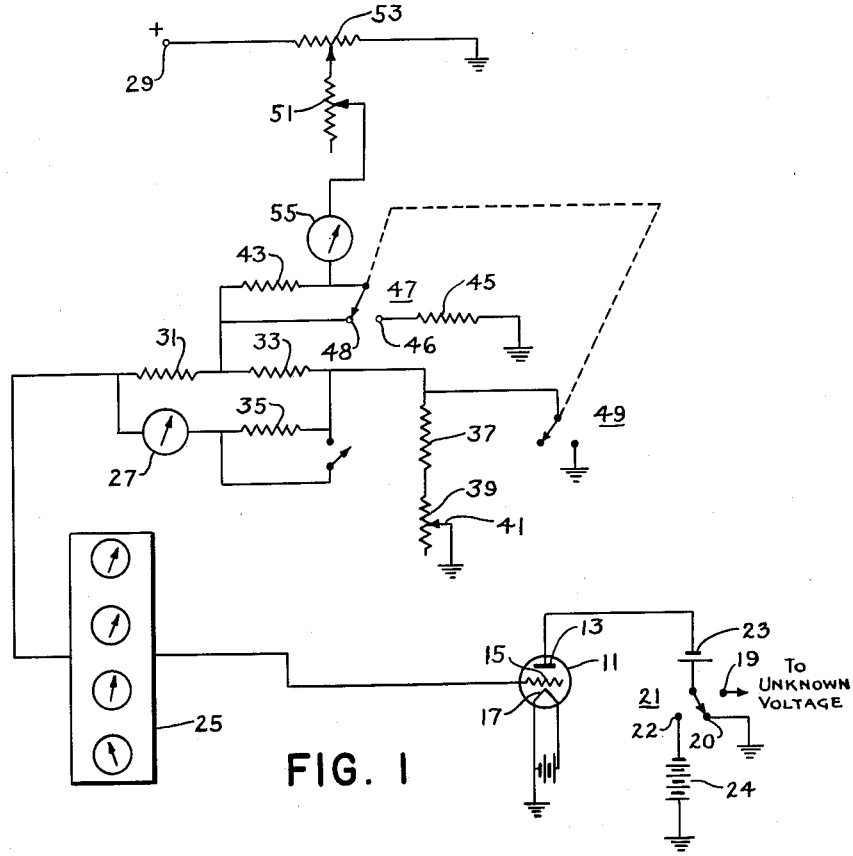
Figure 2:
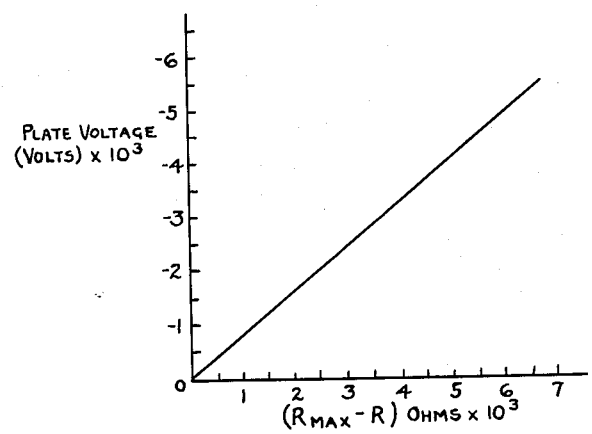

Other objects and advantages will become apparent in the specification taken in connection with the accompanying drawing of which Fig. 1 is a schematic wiring diagram of a voltmeter constructed in accordance with the principles of this invention; and Fig. 2 is a curve illustrative of a characteristic of the circuit shown in Fig. 1.

As shown in the drawing, a vacuum tube 11, which may be of the type known commercially as an 811 and having a plate 13, grid 15, and cathode 17 is employed. Such a tube has an amplification factor in the neighborhood of 200 and, thus, is useful for the present purpose. It will be understood, however, that any other tube of comparable design and characteristics may advantageously be used, the above-mentioned 811 being cited merely as illustrative and in no way restrictive of the scope of the invention.

The negative terminal of the voltage to be measured is applied to the plate 13 of the tube 11 through one tap 19 of a multitap switch 21 and a small fixed negative bias is provided by a battery 23, which bias serves to prevent any cathode current from flowing into the plate 13 when at zero voltage. Tap 20 of switch 21 is connected to ground, and tap 22 of switch 21 is connected to the negative terminal of a standard battery 24 the positive terminal of which is connected to ground.

The change in the grid voltage is measured by means of a bridge network which includes, in one arm, a precision resistance 25. Resistance 25 may be of any suitable conventional type of resistance box having plural stages that can be varied until the grid current flowing therethrough is balanced by the current from a fixed current source. The balance of the grid current is noted by means of a sensitive galvanometer 27, which is connected in series with resistance 35, hereinafter described, across the diagonal of the bridge. The arm of the bridge containing the resistance 25 also contains the tube 11 and bias-voltage source 23, all connected in series. The positive terminal of a reference-voltage direct-current supply 29 is connected to the bridge node defined by the junction of a pair of equal-valued resistors 31, 33. The remote terminal of resistor 31 is connected to the junction of galvanometer 27 and resistance 25 while the remote terminal of resistor 33 is connected to the galvanometer 27 through resistance 35. It will be apparent that resistors 31 and 33 form, in effect, arms of the bridge. Also connected in an arm of the bridge circuit are a pair of series-connected resistors 37, 39 one side of which is connected, as shown, to the junction of resistors 33 and 35, the other side being connected through a variable tap 41 to ground.

It can be shown that the voltage change on the plate, for constant grid current, is given by the simple relationship $$V - V_0 = -\mu(R_{max.} - R)i_g$$

where $\mu$ is the amplification factor, $i_g$ is the grid current, and where $V_0$ is the initial voltage on the plate when R equals $R_{max.}$. For $V_0$ equals 0, the resistance values, $(R_{max.} - R)$, can be made to read directly the voltage V on the plate when $i_g$ equals $1/\mu$.

Using a sensitive galvanometer 27, an accuracy of 0.05 percent or better can be obtained with an input resistance of greater than $5 \times 10^{10}$ ohms.

In order to insure constancy in the calibration, a special circuit is provided for immediate checking against a constant reference voltage source of comparatively low value. Since the input resistance is of the order of $5 \times 10^{10}$ ohms, the current drain is so low that a light dry battery of 250 volts serves satisfactorily as the reference voltage over a long period of time.

It is so arranged that the sensitivity of the circuit can be raised ten times, enabling accurate calibration without affecting the load of the supply battery 29. This is accomplished by including in the supply circuit a network comprising resistors 43 and 45, which, as shown, are, respectively, in series with the reference supply and in a side branch to ground. The sensitivity increase is then effected by switching the armature of a two-position switch 47 to tap 46, which sets the resistance 43 in series and resistance 45 in parallel to ground. The constant current source also changes simultaneously by a fixed ratio by virtue of a switch 49 ganged to switch 47 to short out resistors 37 and 39. When switch 47 is connected to tap 48, resistor 45 is open-circuited and resistor 43 is short-circuited, the resistors 37, 39 being simultaneously connected into circuit.

The filament supply for the tube is obtained from a constant D. C. source with the positive side grounded. It will be apparent to those skilled in the art that the grounding of the positive side is necessary for the operation of this calibration circuit.

For use in lining up and calibrating the circuit, resistors 51 and 53, each provided with variable taps, are connected, as shown, in series with an ammeter 55.

Lining up of the circuit is acomplished as follows: The filament current is turned on and set precisely at the rated value. Switch 47 is turned to tap 48 and switch 21 is turned to tap 20, and resistance 25 is adjusted at maximum resistance. Resistor 51 and resistor 53 are adjusted until the current indicated by milliammeter 55 remains practically unchanged when switch 47 is switched from taps 48 to 46 or vice versa. Switch 47 is then left at tap 48 and resistor 39 adjusted until balance in the galvanometer 27 is reached.

To calibrate the circuit: Set switch 47 at tap 48 and switch 21 at tap 22. Adjust the resistance 25 until balance in the galvanometer 27 is again obtained. This value of resistance, as indicated on the resistance box, gives the reference point.

The circuit is calibrated by switching switch 47 to tap 46 and switch 21 to tap 22 where a known voltage is applied.

Later on, prior to the use of this voltmeter, one needs only to calibrate it by setting both switches 47 and 21 at taps 48 and 22 respectively, and by setting resistance 25 at the above reference value, and then by adjusting resistor 51 until balance is reached in galvanometer 27.

Fig. 2 illustrates a typical calibration of the herein-described circuit with the grid current constant at 5 ma.

I claim:

Potential measuring apparatus comprising a circuit having two parallel arms, one of said arms comprising a source of reference voltage and a resistive network, the other of said arms comprising a bridge circuit including first and second equal resistances forming two arms thereof, a variable resistance forming a third arm thereof in series with said first resistance, a precision resistance, electron discharge tube and a voltage to be measured, in series with said second resistance, forming the fourth arm thereof, and null indicating means coupling the junction of said first and said variable resistance with the junction of said second resistance with said fourth arm, wherein the precision resistance is coupled to the grid of said tube and the negative terminal of the voltage to be measured is coupled to the plate of said tube.

References Cited in the file of this patent

UNITED STATES PATENTS

| 1,938,136 | Crew | Dec. 5, 1933 |
| 2,276,152 | Bull et al. | Mar. 10, 1942 |
| 2,425,641 | Remde | Aug. 12, 1947 |
| 2,440,283 | Levy | Apr. 27, 1948 |
| 2,452,880 | Van Beuren | Nov. 2, 1948 |
| 2,534,928 | Schneeberger | Dec. 19, 1950 |

OTHER REFERENCES

Publication I: "A Precision High Voltage Vacuum-Tube Voltmeter," Luke C. L. Yuan, The Review of Scientific Instruments, vol. 19, Number 7, July 1948, pp. 450–452. (Copy in Scientific Library 171–95–22B.)

Publication II: Standard Rate And Data Service, Business Paper Section, vol. 31, No. 10, Part 2, May 15, 1949, page 350. (Copy in Scientific Library.)

Publication III: "An Inverse Valve Voltmeter" Otto H. Schmitt, Journal of Scientific Instruments, vol XV, No. 4, April 1938, pp. 136, 137. (Copy in Scientific Library, 171–95–22B.)